J. BARBERIE.
MEANS FOR CONVERTING AN ORDINARY ROLL FILM CAMERA INTO A FOCAL PLANE SHUTTER CAMERA.
APPLICATION FILED FEB. 8, 1913.
1,075,751.  Patented Oct. 14, 1913.
2 SHEETS—SHEET 2.
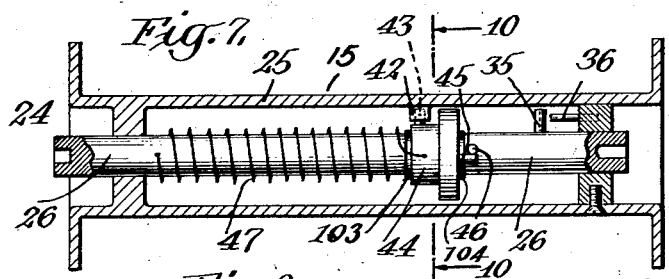
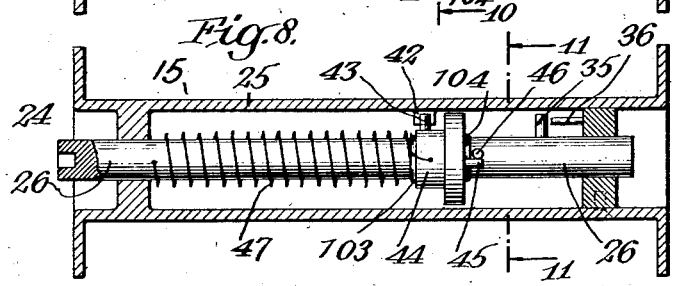
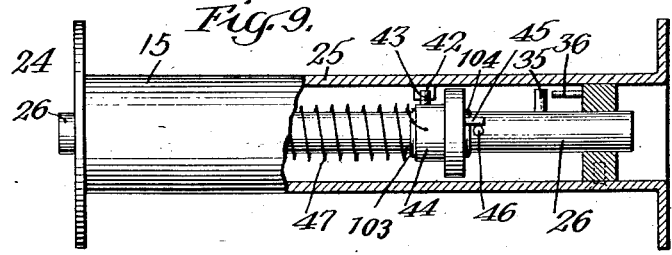
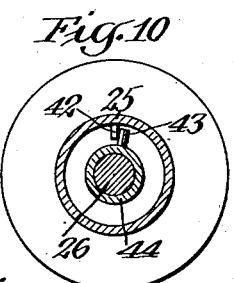
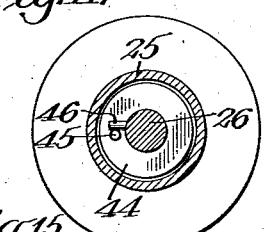
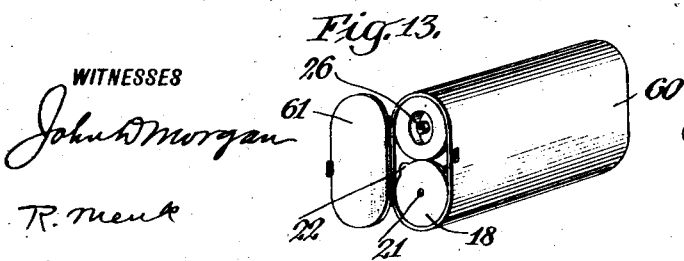
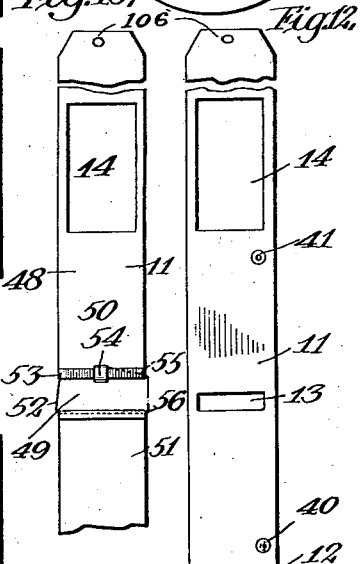
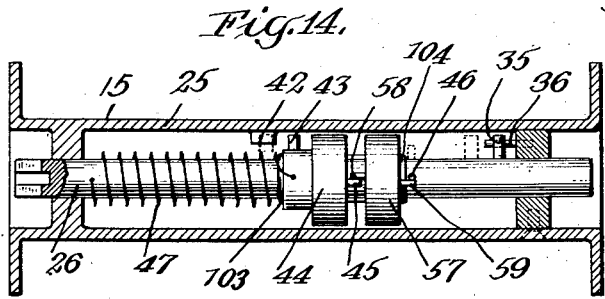
WITNESSES
John D Morgan
R. Menk
INVENTOR
John Barberie
BY
Alan M Johnson
ATTORNEY

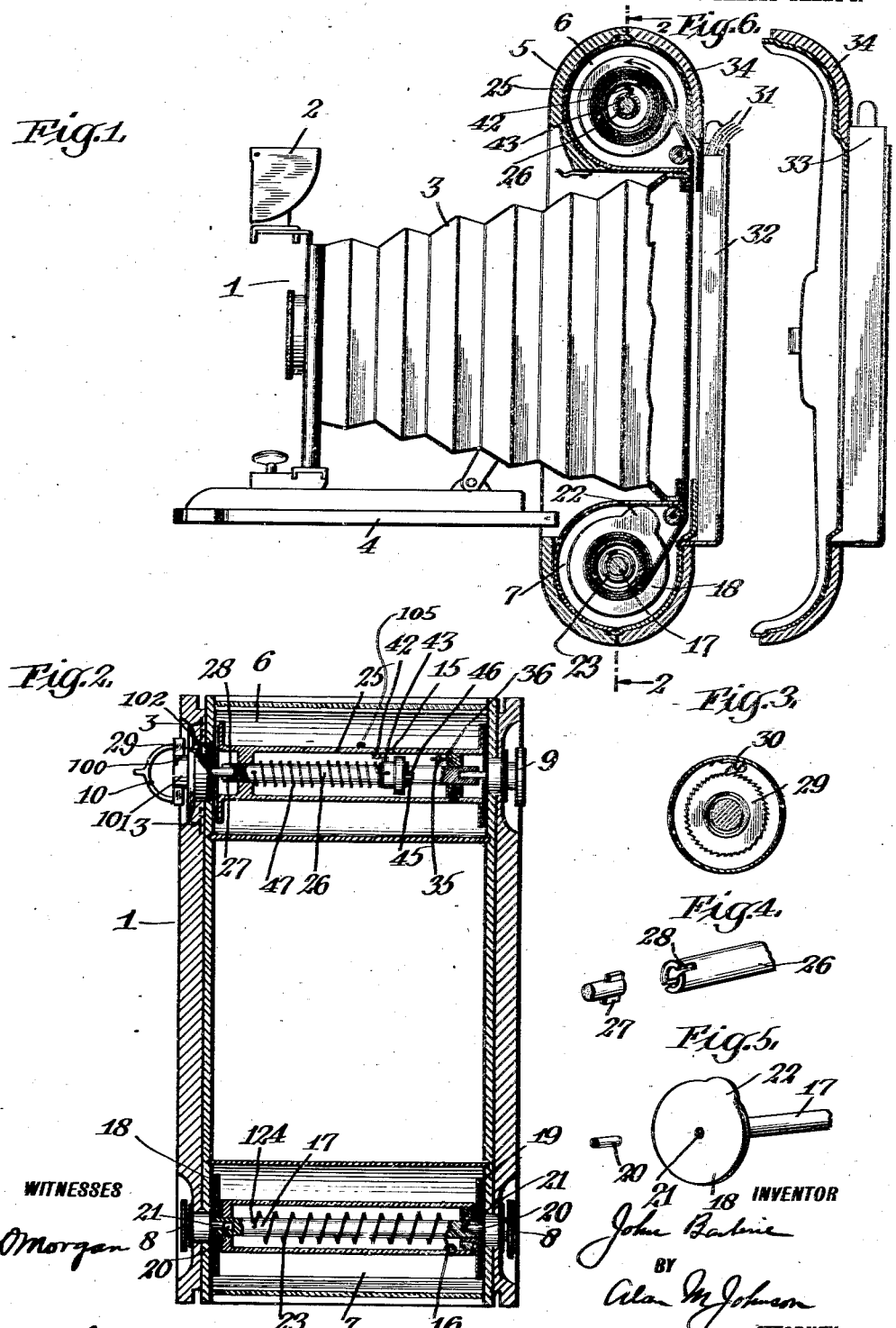

UNITED STATES PATENT OFFICE.

JOHN BARBERIE, OF UPPER MONTCLAIR, NEW JERSEY.

MEANS FOR CONVERTING AN ORDINARY ROLL-FILM CAMERA INTO A FOCAL-PLANE-SHUTTER CAMERA.

1,075,751.          Specification of Letters Patent.     Patented Oct. 14, 1913.

Application filed February 8, 1913. Serial No. 747,113.

*To all whom it may concern:*

Be it known that I, JOHN BARBERIE, a citizen of the United States, and a resident of Upper Montclair, in the county of Essex and State of New Jersey, have invented a certain new and useful Improvement in Means for Converting an Ordinary Roll-Film Camera into a Focal-Plane-Shutter Camera, of which the following is a specification, taken in connection with the accompanying drawings, which form a part of the same.

My invention relates to cameras and more particularly to means for converting an ordinary roll film camera into a focal plane shutter camera.

My invention further comprises the combination of an ordinary roll film camera with a demountable or removable focal plane shutter, the focal plane shutter with its mechanism occupying the spaces ordinarily occupied by the roll film of the camera.

My invention further comprises a demountable and removable focal plane shutter as an article of manufacture so that it can be bought by persons owning an ordinary roll film camera and be used interchangeably in such cameras with the ordinary roll film.

Various mechanisms may be used to accomplish these results. The ones I have shown are simply by way of illustration, it being understood that my invention is not to be confined to the specific mechanism illustrated.

I have shown my invention in connection with an ordinary folding pocket kodak but it is to be distinctly understood that it is adapted to be used with any roll film camera, my removable focal plane shutter being used interchangeably in the camera with the roll films which are ordinarily used in that form of camera.

Focal plane shutters consisting of a flexible piece of cloth or similar material having one or more openings or slits to give different exposes are well known in the art and I make no claim to such a shutter considered alone. It is well known that these focal plane shutters permit the user to take pictures of moving objects, the exposure being as short as one thousandth of a second, whereas the speed of an ordinary shutter will not be greater than one hundredth of a second and many of them do not give shorter exposures than one fiftieth of a second. The ordinary shutter, therefore, cannot be relied upon to take the picture of a moving object. With the focal plane shutters, however, clear and beautiful pictures are easily taken of objects moving at high speed, the objects being clearly and exactly defined. This adds greatly to the charm and pleasure of amateur photography and also enhances the value of press photography.

A person who has puchased an ordinary roll film camera, such for example as the folding kodak type which I have shown in Fig. 1, will in time become dissatisfied with the pictures of moving objects which he can obtain with the ordinary shutter used therein and will aspire to take quickly moving objects. It is well known that this type of camera having the ordinary slow speed shutter will not take these pictures satisfactorily. For the amateur or the professional to gratify his wish to take pictures of moving objects requires the considerable expense of purchasing a new camera in which a focal plane shutter is used leading practically to the abandonment of his older camera, there now being thousands of this type on the market and others being continually manufactured.

By my invention I convert an ordinary roll film camera into one having a focal plane shutter so as to take pictures of objects moving at high speed by mounting in the compartments usually used by the roll film a focal plane shutter. This permits the camera to be used with a film pack or plate back so that accurate and beautiful speed pictures can be taken by the same camera at an insignificant expense, compared to the purchase of a new camera. And, further, by my invention, the camera can be in a few moments converted back into a roll film camera when desired. I accomplish these results preferably without altering in any particular the structure of the roll film camera. In addition to occupying the spaces ordinarily occupied by the roll film, I also, though not necessarily, employ the same bearings that are used in the camera to support and operate the roll film reels. By my invention I also use the same winding key to operate my focal plane shutter that is used normally to operate the roll film in the camera.

The above is a clear statement of my invention. Various mechanisms may be used to accomplish it. I have shown by way of example several such mechanisms but it is to be distinctly understood that my invention is not to be limited to the particular form of focal plane shutter and mechanism which I have shown by way of illustration.

In the accompanying drawings showing illustrative embodiments of my invention and in which the same reference numerals refer to similar parts in the several figures,—Figure 1 is a side elevation, partly in section, of an ordinary roll film camera equipped with my invention; Fig. 2 is a vertical section substantially on the line 2—2 of Fig. 1 looking in the direction of the arrows, the bellows being omitted for purposes of clearer illustration; Fig. 3 is a section on the line 3—3 of Fig. 2; Fig. 4 is a perspective fragmentary view of a detail; Fig. 5 is a perspective view of a detail; Fig. 6 is a sectional view of an ordinary plate back; Fig. 7 is a longitudinal vertical section through one of my rolls showing the release mechanism moved partly inward preliminarily to being released; Fig. 8 is a view similar to Fig. 7 showing the parts in their second position or after one revolution of the drum, and at the beginning of the second revolution; Fig. 9 is a plan view partly broken away showing the same mechanisms as in Figs. 7 and 8 but in the third position, or at the end of the second revolution of the drum; Fig. 10 is a transverse vertical section substantially on the line 10—10 of Fig. 7; Fig. 11 is a transverse vertical section substantially on the line 11—11 of Fig. 8; Fig. 12 is a plan view of one form of a focal plane shutter with one of the drums; Fig. 13 is a perspective view of my demountable focal plane shutter in a casing or container; Fig. 14 is a longitudinal vertical section through a modified form of winding drum; Fig. 15 is a fragmentary plan view of a modified form of focal plane shutter showing an adjustable opening.

In the illustrative embodiments of my invention shown in the drawings, 1 is an ordinary pocket folding kodak or other roll film camera having the ordinary finder 2, bellows 3, hinge cover 4, body member 5 with the film pockets 6 and 7, bearings, 8, 8, 9 and winding key 10. All these elements form no part of my invention except as they may be used in combination with my demountable focal plane shutter.

In the pockets 6 and 7 the common form of roll film is ordinarily mounted by having its reels (not shown) coöperate with the bearings 8, 8 in the pocket 7 and with the bearing 9 and winding key 10 in the pocket 6. After a picture has been taken upon the film it is wound by the winding key 10 on the reel which is mounted in the compartment 6 as the new or additional film is unwound from the reel in the compartment 7, all of which is well known in the art. By my invention, I mount the demountable focal plane shutter 11, Fig. 12 with proper mechanism to operate it, which mechanism is a part of my focal plane shutter, within the same compartments 6 and 7 normally used by the roll film. This mechanism is such that it is preferably operated by the same winding key 10 which operates the roll film when the latter is used in this type of camera. Of course, when I refer to the winding key 10 I do not mean this particular type of winding key but any winding key which ordinarily is employed to wind up a film. This focal plane shutter mechanism is provided with some suitable catch or release so that when the catch is tripped or released the focal plane shutter 11 will be instantly operated to permit an exposure through the aperture 12 or 13 or 14 as the case may be, these openings or slits being of different size as well known in such focal plane shutters.

By way of illustration I have shown my focal plane shutter provided with two rolls or drums 15 and 16, the latter being mounted in the compartment or pocket 7 of the camera, and the former in the pocket 6. The drum 16 is formed hollow and has a spindle 17 extending through it, the ends of the spindle being connected to the end pieces 18 and 19, each of them being preferably provided with an axial bore 20, 20 to receive and coöperate with the pins 21, 21 of the bearings 8, 8. The end piece 18 is preferably provided with a lug or shoulder 22, Figs. 1 and 5 to coöperate with the walls of the pockets 7 to prevent the rotation of the axle or arbor 17. Between this axle or arbor 17 and the drum 16 I mount a coil spring 23 having one end connected to the arbor 17 and the other end secured in any suitable manner to the drum 16. The focal plane shutter 13 is normally rolled or wound upon the drum 16, the unwinding of the shutter from this drum 16 causes tension to be placed upon the coil spring 23 owing to the fact that one end of the spring is connected to the drum 16 while the other end 124 is held fast on the axle 17 which is held from rotation within the pocket 7.

My winding drum 15, Figs. 2 and 7, comprises a rotating cylinder 25 mounted upon an arbor 26. This axle or arbor 26 can be rotated in one direction by the non-circular pin 27 of the winding key 10, Figs. 2 and 4 coöperating with the non-circular opening 28 of the axle or arbor 26. The movement of the axle 26 in only one direction is controlled in any suitable manner such for example as by the ratchet wheel 29 mounted on the winding key 10 coöperating with the pawl 30 mounted on the frame of the camera. It is apparent, therefore, that by bringing the axle 26 into engagement with the non-circular portions 27 of the key 10 the winding drum 15 can be rotated in one direction, the same as the roll film of the camera would have been operated, to unwind the focal plane shutter 11 from the drum 16 and onto the cylinder or drum 25, to which it may be fastened in any suitable manner by the button 105 engaging with the hole 106 in the shutter. In unwinding the focal plane shutter it is, of course, understood that the spring 23 will be placed under tension as previously described. I then provide suitable mechanism to release the drum 25 from the axle or arbor 26, so that when the release mechanism is operated the focal plane shutter 11 will be instantly wound back upon the drum 16 and in doing so it will perform its function of exposing the film 31 in the film pack 32, or the plate in the plate holder 33, Fig. 6, whichever happens to be used with the camera, it, of course, being understood that the film pack 32 and the combination plate back 34 are old and used interchangeably.

To insure the exposure of the entire film surface in the film pack, or the plate, without enlarging the compartments 6 and 7, I preferably employ mechanism of any suitable character which will permit the drum 25 to rotate more than once when the trip mechanism is released, though, of course, it is to be understood that my invention is not to be confined to a multiple rotation of the winding drum 25. In the ordinary camera, it is advisable to permit the winding drum 25 to rotate twice on each release or exposure, so that the particular opening or aperture 12, 13 and 14 may be momentarily passed before the comparatively large film or plate used with this type of camera. In some cameras the winding drum 25 to fit within the compartment 6 of the camera would not play out enough of the focal plane shutter 11, on one revolution of the drum 25 to allow the shutter aperture to pass entirely over the film or plate and give a successful exposure. In such cameras I use any suitable mechanism which will permit more than one revolution of the winding drum 25 on each exposure. I have shown by way of illustration a mechanism for accomplishing this result, reference at this point being more particularly called to Figs. 7 to 11 inclusive. When the winding key 10 is operated to rotate the axle or arbor 26 to wind up the focal plane shutter 11 onto the drum 25 the movement of the arbor is transmitted to the drum 25 through the pin 35 carried on the axle coöperating with the pin 36 carried by the drum 25, Fig. 7. Sufficient of the focal plane shutter 11 is wound upon the drum 25 to bring the indicating members 37 or 40, or 41 beneath a colored window (not shown) which will be formed in a suitable part of the camera frame or casing, say in the rear wall of the lower pocket 7. The focal plane shutter 11 will be held in this position, against the tension of the spring 23 in the drum 16, by reason of the ratchet wheel 29 coöperating with the pawl 30 preventing retrograde or backward rotation of the arbor or axle 26.

When it is desired to take an exposure the button or bearing 9, Fig. 2, which is preferably the same as the bearing used with the roll film reel, is pressed inward slightly sufficient to move the pin 35 from engagement with the pin 36 carried by the drum 25 as illustrated in Fig. 7. The inward movement of the axle 26 is readily permitted by the slot connection 100 between the winding key 10 and the member 101 against the action of the spring 102, this being the common construction to permit the insertion of a film reel. Spring collars 103 and 104 keep the sleeve 44 in position on the axle 26. The moment that these two pins escape each other the tension of the spring 23 causes the drum 25 to rotate backward in the opposite direction from winding up the focal plane shutter 11 so as to play out the shutter for the proper exposure.

In some very small cameras one revolution of the drum 26 may be sufficient. In some cameras, however, depending upon the size of the plate, it is advisable and necessary to permit two or more revolutions of the drum 25 upon each release or exposure. In Figs. 7, 8, 9, 10 and 11, I have shown mechanism to permit two revolutions on each release. In this mechanism as soon as the pin 35 has been moved inward sufficient to escape the pin 36 carried by the drum 25 the entire drum 25 will fly around and make one revolution until the lug 42 on the drum 25 is brought back of the pin 43, Fig. 8, upon the loose sleeve 44 which is loosely mounted upon the axle or arbor 26. This will then bring the parts into the position shown in Fig. 8 which is at the end of the first revolution and the beginning of the second. The lug 42 now being on the opposite side of the pin 43 will cause the loose sleeve 44 to make one revolution, with the drum 25, until its pin 45 is brought on the other side of the pin 46 which is also mounted permanently upon the axle or arbor 26. This will then bring the release mechanism into the position shown in Fig. 9. Further rotation of the drum 25 is prevented by the pin 45 now being on the opposite side of the pin 46 which is held from a retrograde or backward movement by the pawl 30 engaging the ratchet wheel 29. The parts after the second revolution of the drum 25 will therefore be in the position shown in Fig. 9. While it takes some little time to describe the operation of this release mechanism, in practice the operation is substantially instantaneous. Pressure on the bearing 9 will then be released permitting the spring 102 to press the axle or arbor 26 laterally to the right as shown in Fig. 7 so that the pins 35 and 36 will again become in engagement, or in the path of each other. The parts are then in position to again wind up the focal plane shutter 11 for the next exposure or by again pressing the button or member 9 any succeeding aperture or slit in the shutter may be passed in front of the sensitive plate and exposure made. The spring 47 which has one end connected to the arbor 26 and the other end connected to the sleeve 44 will return the latter to its normal position.

Instead of using the particular form of focal plane shutter 11, it is, of course, to be understood that I may use such a focal plane shutter as 48, Fig. 15, having a slot 49 adjustable in any suitable manner such as by having the two strips of the shutter 50 and 51 connected by a cord 52 which has one end 53 connected to the strip 50 and thence to the strip 51 and back to the strip 50, the other end of the cord 52 being provided with an adjustable clasp 54 to catch on the metal or other strip 55 with which the end of the strip 50 is bound. The other strip 51 preferably is provided with a similar metal binding 56 under which the cord 52 preferably passes.

In some cases I provide mechanism to permit more than two revolutions of the winding drum. I have shown such a construction in Fig. 14 in which the winding drum 25 is provided with the same pin 36 and lug 42 as previously described but the axle or arbor 26 is provided not only with the loose sleeve 44 with its pins 43 and 45 but I also provide on the same arbor 26 an additional loose sleeve 57, having on one side a pin 58 to coöperate with the pin 45 carried by the first sleeve 44 and on the other side with a pin 59 to coöperate with the fixed pin 46 mounted on the axle or arbor 26. Inward pressure upon the axle or arbor 26 by pressing in the bearing 9 causing the pin 35 to assume the position shown in dotted lines in Fig. 14, so as to escape the pin 36 carried by the drum 25, will cause the drum 25 to instantly rotate three times instead of twice as in the preceding construction.

On the first revolution the lug 42 will revolve and with it the drum 25 making one complete revolution before it engages with the lug 43 carried by the sleeve 44, the parts being at the beginning of the second revolution in substantially the position shown in Fig. 8 in the first construction. On the second revolution of the drum 26 the lug 42 will be back of the pin 43 and cause the sleeve 44 to revolve with the drum 25 carrying this first sleeve 44 around until it has made one complete revolution, when the pin 45 will then be on the other side of pin 58 from the position shown in Fig. 14. The drum 25 will then have made two complete revolutions and the first sleeve 44 one revolution. The pin 44 now, at the beginning of the third revolution being on the other side of the pin 58 from that shown in Fig. 14, will cause this entire second sleeve 57 to make one revolution moving its pin 59 from the position shown in Fig. 14 until it engages on the other side of the pin 46 carried by the axle 26, when the mechanism including the drum 25 will be instantly stopped after having made three revolutions on one release and for one exposure. These additional revolutions are simply to permit a greater length of the focal plane shutter to be played out from the winding drum and be taken up by the drum 16 to get the necessary travel of the exposing aperture over a comparatively large film in film pack or a plate in a plate back, the size of the reels or drums which hold the shutter being necessarily limited in diameter to the available size of film compartments 6 and 7.

In Fig. 13 I have shown my demountable focal plane shutter mounted in a casing or container 60 having a hinge cover 61, my demountable focal plane shutter being there shown as a separate article of manufacture ready for sale, either with a roll film camera, or for independent sale.

When I refer to an ordinary roll film camera, I mean any camera adapted to use roll films and plates or roll films and film pack, which, by its construction, will permit of the operation of a focal plane shutter interchangeably with the roll film and in place of it, the roll film being temporarily or permanently removed.

Having thus described this invention in connection with the illustrative embodiments thereof to the details of which I do not desire to be limited, what is claimed as new and what it is desired to secure by Letters Patent is set forth in the appended claims.

1. In a camera of the type having pockets, and roll supporting bearings for film rolls in the pockets and a winding key, a focal plane shutter including winding rolls and associated actuating mechanism and restraining mechanism, said rolls being demountably mounted in said pockets, and means operable from outside of the camera for releasing the restraining mechanism.

2. In a camera of the type having pockets and roll supporting bearings for film rolls in the pockets, and a winding key, a focal plane shutter including winding rolls and spring actuating mechanism carried by one roll and restraining mechanism carried by the other roll, said rolls being demountably mounted in said pockets, and means separable from the roll carrying the restraining mechanism and operable from outside of the camera for releasing the restraining mechanism.

3. In a camera of the type having pockets and roll supporting bearings for film rolls in the pockets, and a winding key, a focal plane shutter including winding rolls and associated spring actuating mechanism and restraining mechanism, said rolls being demountably mounted in said pockets, and means operable from outside of the camera for releasing the restraining mechanism, one of the rolls of the shutter being detachably connected with the winding key and the restraining release means.

4. In a camera of the type having pockets and roll supporting bearings for film rolls in the pockets, and a winding key, a focal plane shutter including winding rolls and spring actuating mechanism associated with one roll and axially movable restraining mechanism associated with the other roll, and means operable from outside of the camera and operatively connected with the axially movable restraining mechanism to release said mechanism.

5. In a camera of the type having pockets and roll supporting bearings for film rolls in the pockets, and a winding key, a focal plane shutter including winding rolls and a flexible curtain connecting the rolls, a tension device associated with one of the rolls for winding the curtain on the roll when the tension is relaxed, restraining mechanism associated with the other roll, said roll being operatively connected with the winding key, and both rolls demountably mounted in said pockets, and means detachably connected with the roll having the restraining mechanism and operable from outside the camera for releasing said mechanism.

6. In a camera of the type having pockets and roll supporting bearings for film rolls in the pockets, and a winding key, a focal plane shutter including winding rolls demountably mounted in said pockets, and a holder for a plate or film pack supported in exposure relation to the demountable focal plane shutter.

7. An article of manufacture comprising a focal plane shutter, including two drums, a flexible shutter, and means carried by the drums for operating the flexible shutter.

8. An article of manufacture comprising a focal plane shutter including two drums, one of which is provided with means to coöperate with the winding key of a roll film camera, a flexible shutter and self contained means carried by the drums for operating the flexible shutter.

9. An article of manufacture comprising a focal plane shutter including two drums, one end of one of the drums having means to coöperate with the winding key and the other end with the bearing for the film roll of a roll film camera, a flexible shutter and self contained means carried by the drums for operating the flexible shutter.

JOHN BARBERIE.

Witnesses:
JOHN D. MORGAN,
ROSE MEUK.